United States Patent
Barnes

(10) Patent No.: US 7,025,368 B2
(45) Date of Patent: Apr. 11, 2006

(54) PROTECTIVE CAGE FOR MOTORCYCLE ENGINE

(76) Inventor: Timothy E. Barnes, 3200 NCR 810, Alvarado, TX (US) 76009

(*) Notice: Subject to any disclaimer, the term of this patent is extended or adjusted under 35 U.S.C. 154(b) by 33 days.

(21) Appl. No.: 10/732,031

(22) Filed: Dec. 10, 2003

(65) Prior Publication Data

US 2004/0118626 A1 Jun. 24, 2004

Related U.S. Application Data

(60) Provisional application No. 60/449,512, filed on Feb. 21, 2003.

(51) Int. Cl.
B62D 25/00 (2006.01)

(52) U.S. Cl. .............. 280/291; 280/288.4; 280/304.4

(58) Field of Classification Search ............. 280/288.4, 280/291, 304.4; 180/219; 248/288.11, 299.1; D12/110, 114
See application file for complete search history.

(56) References Cited

U.S. PATENT DOCUMENTS

| | | | |
|---|---|---|---|
| 1,473,956 A | 11/1923 | Eyre et al. | |
| 1,941,801 A | 1/1934 | Harley | |
| 3,902,740 A | 9/1975 | Lucier et al. | |
| D244,519 S | 5/1977 | Larsen et al. | |
| 4,030,561 A * | 6/1977 | Hashimoto et al. | 180/219 |
| 4,377,295 A * | 3/1983 | Lemman | 280/303 |
| D270,527 S | 9/1983 | O'Rourke | |
| 4,416,465 A | 11/1983 | Winiecki | |
| 4,451,057 A * | 5/1984 | Lawson | 280/291 |
| 4,454,714 A | 6/1984 | Ikenoya et al. | |
| 4,673,190 A | 6/1987 | Ahlberg | |
| 4,728,121 A * | 3/1988 | Graves | 280/748 |
| 4,768,799 A * | 9/1988 | Millican | 280/291 |
| 4,813,706 A | 3/1989 | Kincheloe | |
| 4,852,900 A * | 8/1989 | Nahachewski | 280/291 |
| 4,925,231 A | 5/1990 | Hamaguchi | |
| 5,106,136 A | 4/1992 | Crain | |
| 5,257,671 A | 11/1993 | Watkins | |
| D348,422 S | 7/1994 | Rasmusen | |
| D361,311 S | 8/1995 | Lindby | |
| 5,609,658 A | 3/1997 | Takemura et al. | |
| 5,704,442 A | 1/1998 | Okazaki et al. | |
| 5,743,561 A | 4/1998 | Kim | |
| 6,116,630 A * | 9/2000 | Thomas | 280/291 |
| 6,161,859 A * | 12/2000 | Cheng | 280/291 |
| D484,074 S | 12/2003 | Henneberry | |
| 6,663,129 B1 * | 12/2003 | Smith | 280/291 |

* cited by examiner

Primary Examiner—Lesley D. Morris
Assistant Examiner—L. Lum
(74) Attorney, Agent, or Firm—Geoffrey A. Mantooth

(57) ABSTRACT

A motorcycle is provided with a protective cage on the side portions of an engine. The cage has two side portions that are separated from one another and are coupled to a common bottom member which extends underneath and/or through the engine. The side portions are coupled to the sides of the motorcycle frame at coupling points. The cage provides a low profile protective barrier between the engine and the ground when the motorcycle is on its side and does not interfere with the rider who wants to perform stunts on the motorcycle. At least one of the coupling points on each side is provided with a projection, which projection has a replaceable cap.

8 Claims, 5 Drawing Sheets

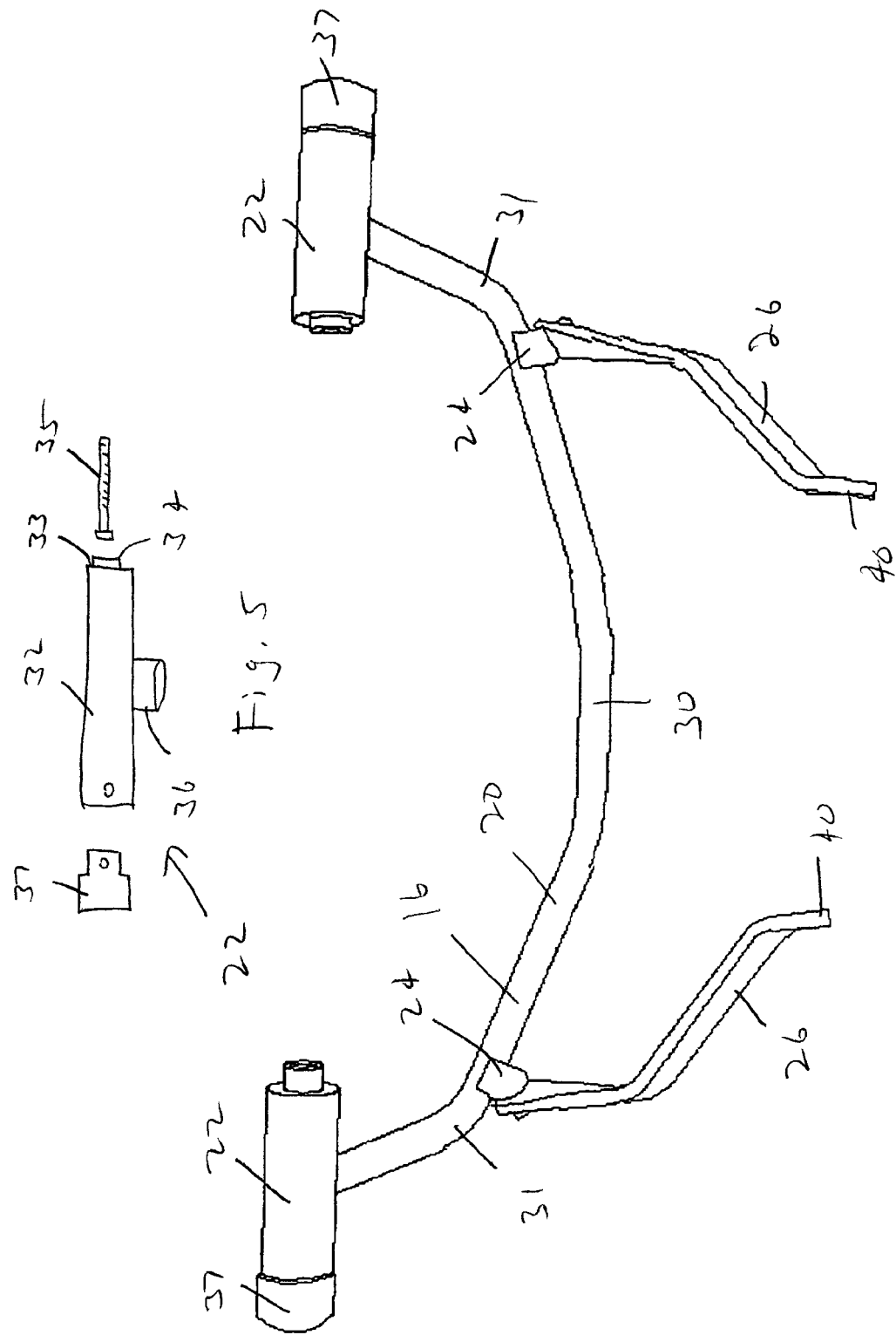

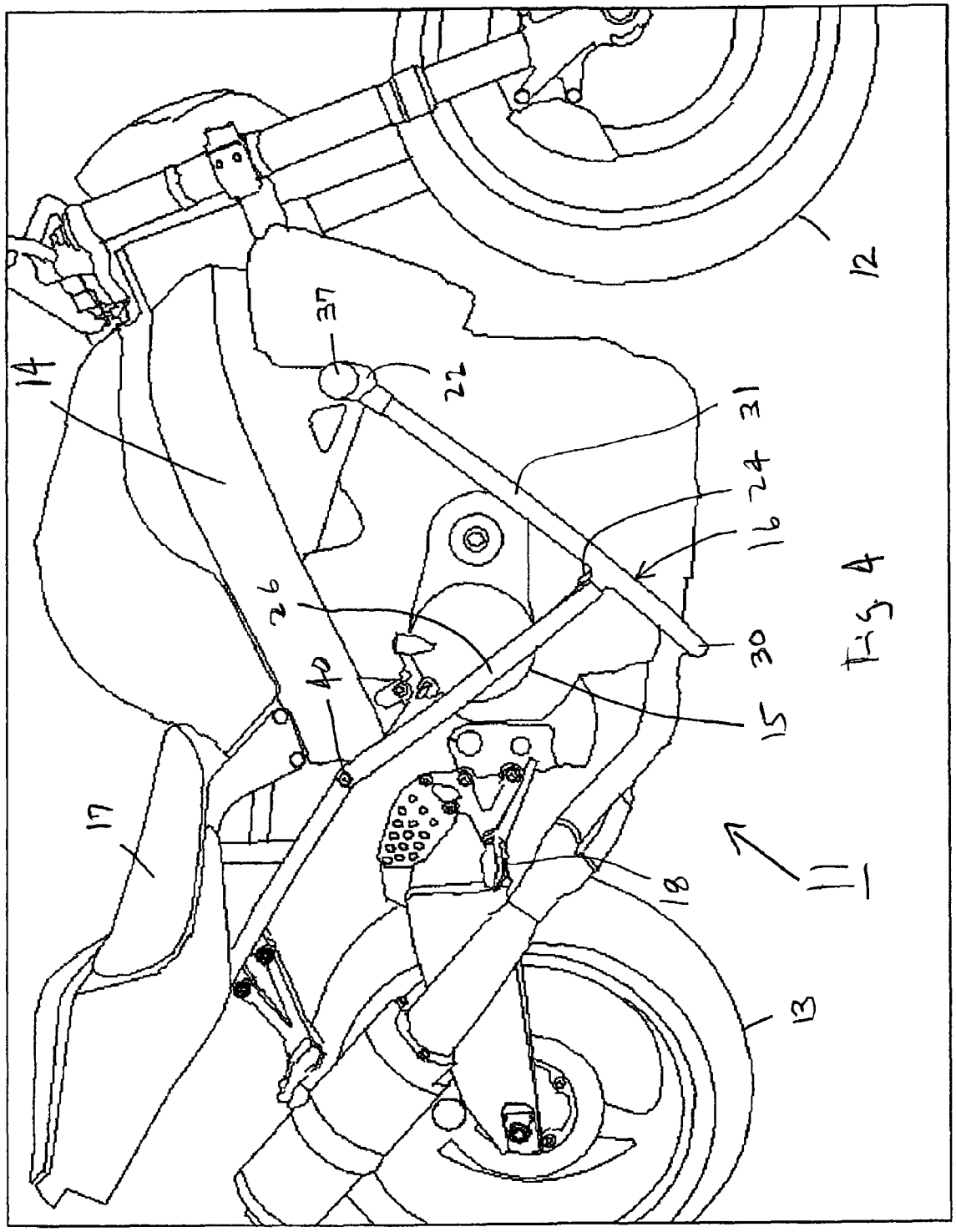

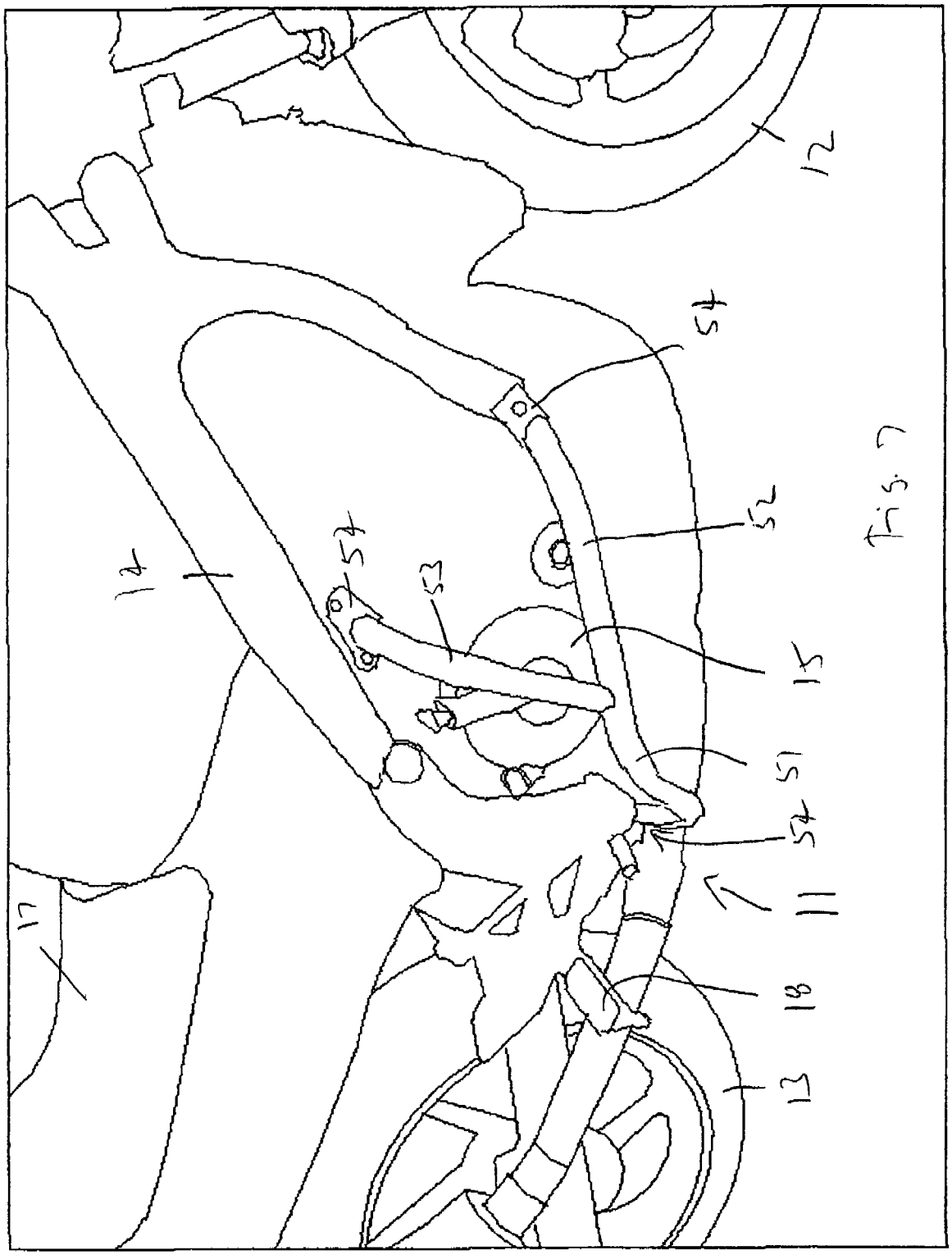

PROTECTIVE CAGE FOR MOTORCYCLE ENGINE

This application is a continuation-in-part of provisional patent application Ser. No. 60/449,512, filed Feb. 21, 2003.

FIELD OF THE INVENTION

The present invention relates to engine protective cages used in connection with motorcycles.

BACKGROUND OF THE INVENTION

Many motorcycle riders perform various stunts and maneuvers on motorcycles. For example, the rider may spin around in a tight circle, pop the front wheel up while moving (a wheelie) and so on.

Because of the nature of the activity, riders often fall and the motorcycle falls to the ground on its side. When these maneuvers are performed on pavement, the engine area of the bike can be damaged by its contacting the pavement.

What is needed is an apparatus to protect the engine area of the motorcycle during stunt-type riding or dangerous maneuvers, which apparatus does not interfere with the ability of the rider to ride the motorcycle and perform these maneuvers.

SUMMARY OF THE INVENTION

The present invention provides a protective cage for a motorcycle that comprises a bottom member and two side portions. The bottom member has two ends. The two side portions are separated from one another, with each side portion being coupled to an end of the bottom member. Each side portion has at least two coupling points structured and arranged for coupling the cage to the motorcycle.

In accordance with one aspect of the present invention, the protective cage further comprises a projection located at one of the coupling points on each side portion, with the projection extending in a direction that is generally parallel to the bottom member.

In accordance with another aspect of the present invention, the cage further comprises a replaceable cap located on the outside end of each projection.

In accordance with still another aspect of the present invention, the coupling points of each side portion are aligned with an imaginary line that is perpendicular to a second imaginary line that extends between the two side portions.

The present invention also provides a motorcycle that comprises a frame and front and rear wheels. An engine is located between the front and rear wheels. The motorcycle has a seat and two sides. A member is located on each side and comprises two coupling points, with one coupling point coupled to the frame on the respective side. The member extends down along the engine. The other coupling point of the member is coupled to the frame. On each side, a brace is connected to the respective member and extends along the engine. The brace has a coupling point that is coupled to the frame.

In accordance with one aspect of the present invention, the member and brace form a unitary piece, with the member extending underneath the engine from one side to the other.

BRIEF DESCRIPTION OF THE DRAWINGS

FIG. 3 is a view of the engine cage, shown from the upper rear.

FIG. 4 is a right side view of a motorcycle having the engine cage of FIGS. 1–3 mounted thereon.

FIG. 5 is an exploded view of a peg.

FIG. 7 is a right side of a motorcycle having the protective cage of FIG. 6 mounted thereon.

DESCRIPTION OF THE PREFERRED EMBODIMENTS

Figure 1:
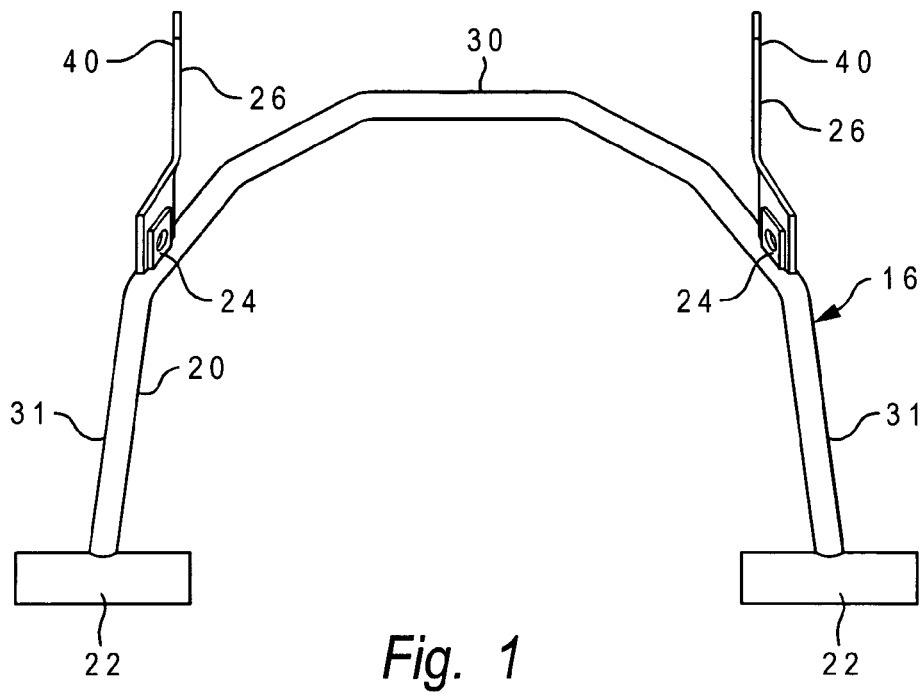
FIG. 1 is a top schematic view of the protective cage of the present invention, in accordance with a preferred embodiment.
Figure 2:
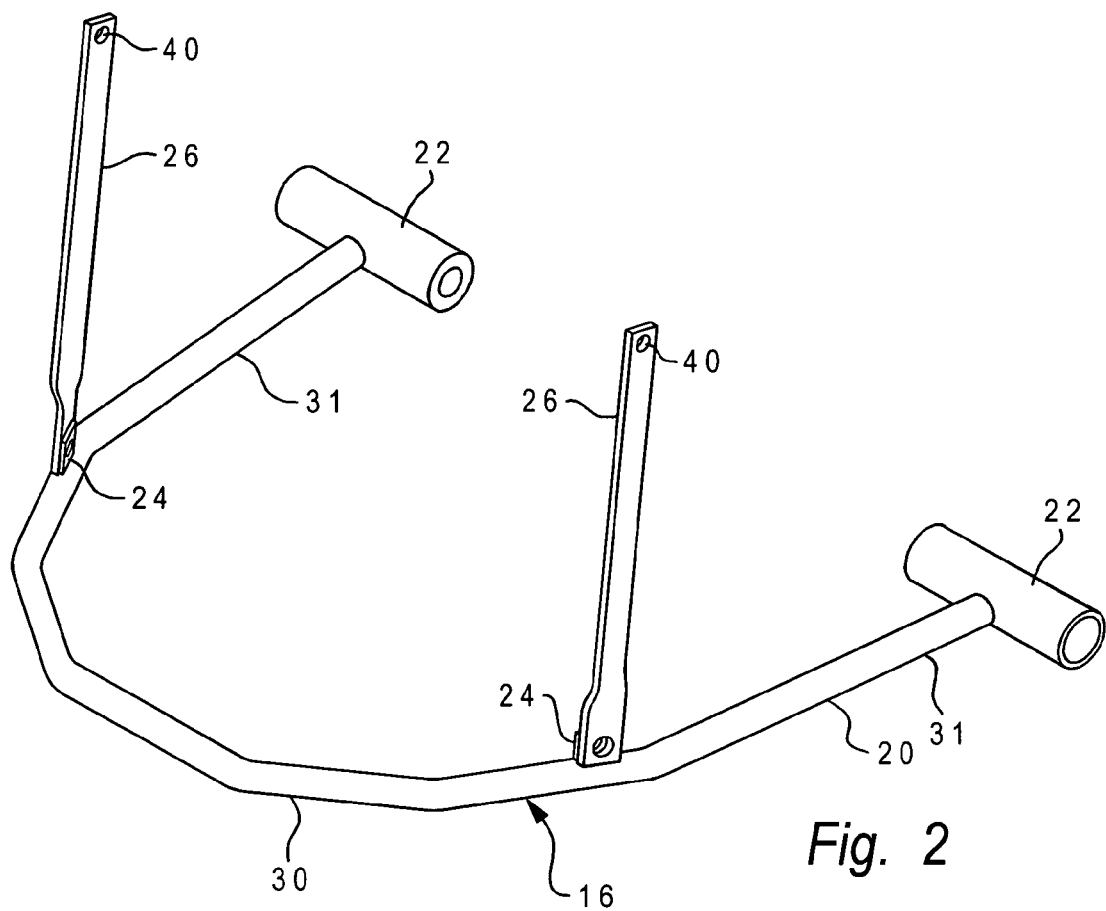
FIG. 2 is a schematic perspective view of the cage as seen from the right rear side.

In the description that follows, the terms "upper" and "lower" will be used to reference to the orientation of the motorcycle shown in FIGS. 4 and 7. FIGS. 4 and 7 show the right side of the motorcycle.

The motorcycle 11 shown in FIG. 4 has front and rear wheels 12, 13 and a frame 14 extending between the wheels. The motorcycle has an engine 15. In many motorcycles, the engine 15 is part of the frame 14 in order to reduce weight. The cage 16 can be coupled to the frame 14 either directly to a discrete structural frame component or indirectly by way of the engine 15. The motorcycle also has a seat 17 and handlebars (not shown) for steering the front wheel 12. Foot pedals 18 are provided below the seat 17 to the rear of the engine 15. The foot pedals 18 extend outwardly from the sides. The motorcycle has a right side and a left side.

The engine 15 protrudes laterally out from the motorcycle 11. Forward of the engine 15 the sides of the motorcycle taper in towards the front wheel 12. Because of the construction of the motorcycle, the engine 15 contacts the ground when the motorcycle is on its side.

The present invention provides a protective cage that protects the engine. The cage 16 is positioned so as to be interposed between the engine and the ground when the motorcycle is on either its right or left side. The protective cage 16 has a relatively low profile so as not to interfere with the rider when the rider is riding the motorcycle.

In addition, the cage protects other components of the motorcycle, such as the frame, various trim components (typically made of plastic) on the sides of the motorcycle, and even the handlebars. The cage projects out somewhat from the sides of the motorcycle. Thus, when the motorcycle is lying on one of its sides, the motorcycle contacts the ground with the sides of the tires (or wheels) and the cage.

Referring to FIGS. 1–4, the protective cage will now be described. FIGS. 1–4 show the protective cage 16 of the present invention, in accordance with a preferred embodiment. The cage 16 has a bottom member 30 and two side portions 31 which together form a "U" shaped brace 20. Side portions 31 also each have a lateral brace 26.

The "U" shaped brace is formed of rigid metal tubing. The brace can also be formed of other materials having the necessary strength and rigidity. The lateral braces 26 are flat pieces coupled to the brace by way of tabs 24. The braces 26 can be bolted, pinned or welded to the tabs and brace 20.

At the free ends of the "U" shaped brace 20 are pegs 22. The pegs 22 extend, or project, laterally from the motorcycle.

FIG. 5 shows an exploded view of a peg 22 or slider. It has a sleeve 32 which is open on its outer end. The inner end 33 is designed to mate with the frame. Some frames have receptacles, wherein the inner end 33 has a boss 34 (shown in FIG. 5). Some frames are flat, wherein the inner end 33 is also flat. A bolt 35 is put inside the sleeve 32 and extends through the inner end, which bolt then secures the peg to the motorcycle frame. The sleeve 32 has a fitting 36 that extends out from the sleeve for coupling to the member 20. The outer end of the sleeve receives a protective cap 37. In the preferred embodiment, the cap 37 is made of plastic, such as Delron. The cap 37 is secured by a bolt extending transversely through the sleeve 32 and cap.

The cage is coupled together by nuts and bolts, pins, welding or other means.

The cage 11 is installed on a motorcycle by aligning the side portions 31 adjacent to the sides of the engine 15 and having the bottom member 30 extend beneath the engine. The cage 11 has two coupling points per side, one at the peg 22, the other at the end 40 of the linear brace 26. The cage is coupled to the motorcycle by way of bolts which are received by threaded holes located in the frame. The cage can be secured to the motorcycle by other means as well.

The cage 11 is fixed against rotation because there are two coupling points per side of the motorcycle. The two coupling points on each side are along an imaginary line that is generally parallel to the longitudinal axis of the motorcycle and generally perpendicular to a second imaginary line that extends between the two sides. The cage thus provides a rigid and immovable barrier between the engine and the ground when the motorcycle is lying on its side. The member 20 extends from an upper part of the engine 15 to a position beneath the engine and the lateral brace 26 extends from an upper part of the engine to the member 30. The profile of the member and lateral brace is low so as not to interfere with the legs of the rider.

The pegs 22 project laterally outward. The pegs 22 also serve to protect the engine from the ground when the motorcycle is on its side. The outer ends of the pegs contact the ground. The caps 37 typically exhibit wear from crashes. The caps 37 can be easily replaced.

Figure 6:
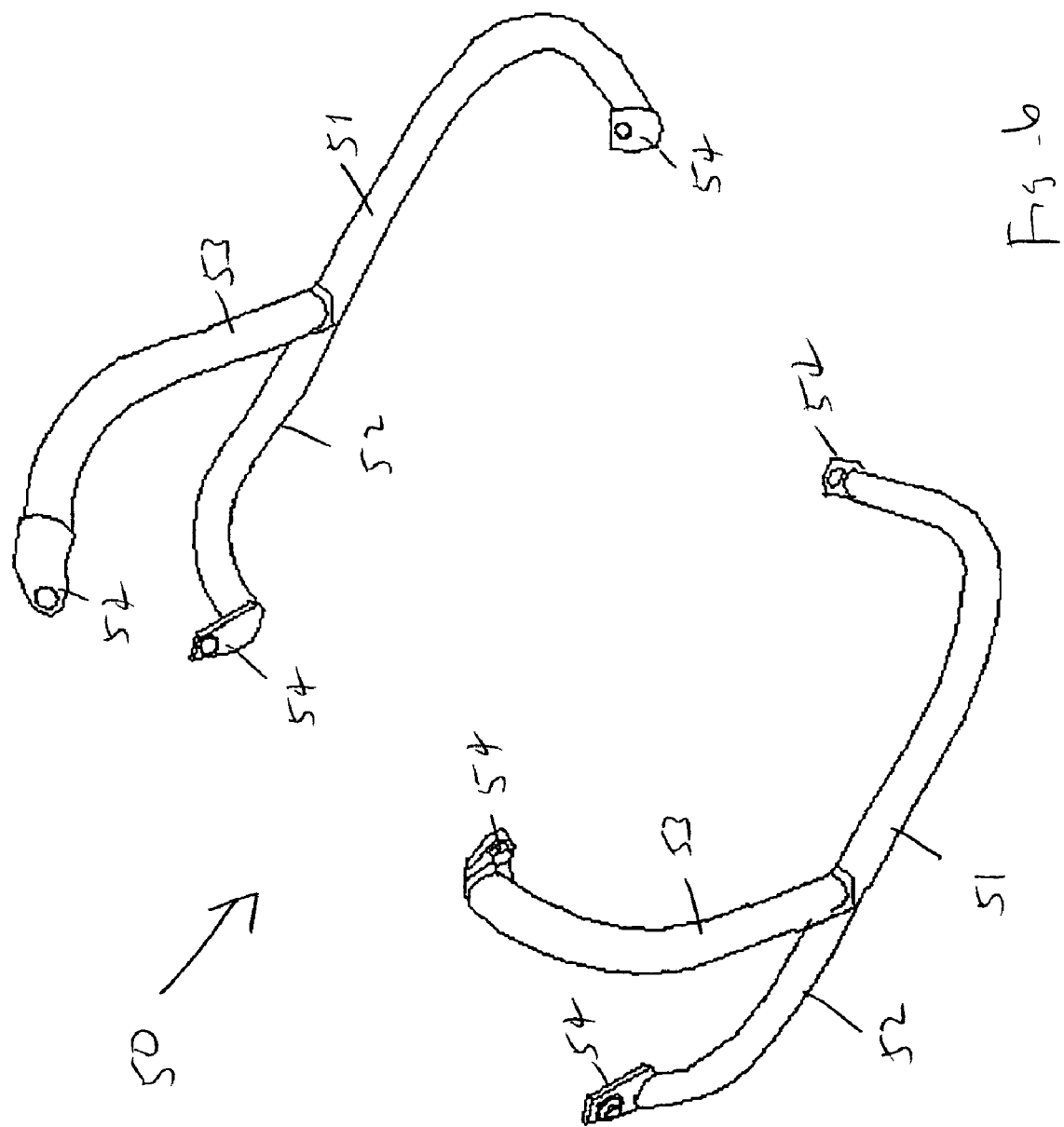
FIG. 6 is a view of another embodiment of a protective cage, as viewed from the upper left side.

A protective cage 50 in accordance with another embodiment is shown in FIGS. 6 and 7. In this embodiment, the cage has right and left side portions 51, which side portions are independent from one another. Each side portion of the cage has a member 52 and a brace 53 coupled to the member. Each side portion 51 is coupled to the motorcycle at three coupling points 54. As shown in FIG. 7, the side portion extends across the engine 15 to provide a low profile barrier. One coupling point 54 is above the engine, another coupling point is in front of the engine and the other coupling point is beneath the engine.

The configuration of the cage side portions 51 can change (for example, "Y" shaped, "T" shaped and so on) and the location of the coupling points can change.

The foregoing disclosure and showings made in the drawings are merely illustrative of the principles of this invention and are not to be interpreted in a limiting sense.

The invention claimed is:

1. A motorcycle with a protective cage, comprising:
    a) a frame and front and rear wheels;
    b) an engine located between the front and rear wheels;
    c) a seat;
    d) two sides;
    e) a member located on each side comprising two coupling points, with one coupling point coupled to the frame on the respective side, the member extending down along the engine;
    f) on each side, a brace being connected to the respective member and extending along the engine, the brace having a coupling point coupled to the frame;
    g) the members and braces forming a unitary piece, with the members extending underneath the engine from one side to another.

2. The motorcycle of claim 1 further comprising a projection located on each side at one of the coupling points, the projection extending outward from the frame.

3. The motorcycle of claim 2 further comprising a replaceable cap located on an outside end of each projection.

4. A motorcycle with a protective cage, comprising:
    a) a frame having front and rear wheels mounted thereto;
    b) an engine mounted to the frame and located between the front and rear wheels;
    c) two sides;
    d) a cage located on each side, each cage having two coupling points that couple the respective cage to the frame, each cage located laterally of the engine;
    e) each cage extending from the respective coupling points to a connecting member, the cages being connected to one another by the connecting member that extends from one side to the other side, the connecting member being unconnected to the frame, the connecting member forming a connecting point with each cage;
    f) the coupling points and connecting point forming the points of a triangle when the motorcycle is viewed from the respective side.

5. A motorcycle with a protective cage, comprising:
    a) a frame having front and rear wheels mounted thereto:
    b) an engine mounted to the frame and located between the front and rear wheels;
    c) two sides;
    d) a cage located an each side, each cage having two coupling points that couple the respective cage to the frame, each cage located laterally of the engine;
    e) the cages being connected to one another by a member that extends from one side to the other side;
    f) each cage further comprising a projection located at one of the coupling points, the projection extends laterally outward from the frame to a location that is laterally outside the respective cage;
    g) a replaceable cap located on an outside end of each projection.

6. A motorcycle with a protective cage, comprising:
    a) a frame having front and rear wheels mounted thereto;
    b) an engine mounted to the frame and located between the front and rear wheels;
    c) a cage located on each side, each cage located laterally of the engine;
    d) the cages being connected to one another by a member that extends from one side to the other side, the member forming a connection point with each cage;
    e) each cage being coupled to the frame by two coupling points, for each cage, the coupling points and the connection point forming points of a triangle when the motorcycle is viewed from the respective side.

7. The motorcycle of claim 6 wherein each cage further comprises a projection located at one of the coupling points, the projection extends laterally from the frame.

8. The motorcycle of claim 7 further comprising a replaceable cap located on an outside end of each projection.

* * * * *